(12) United States Patent
Wong

(10) Patent No.: US 10,111,249 B2
(45) Date of Patent: Oct. 23, 2018

(54) COMMON CHANNEL AQUISITION

(71) Applicant: Alcatel Lucent, Boulogne Billancourt (FR)

(72) Inventor: Shin Horng Wong, Swindon (GB)

(73) Assignee: ALCATEL LUCENT, Boulogne-Billancourt (FR)

( * ) Notice: Subject to any disclaimer, the term of this patent is extended or adjusted under 35 U.S.C. 154(b) by 54 days.

(21) Appl. No.: 14/414,260

(22) PCT Filed: Jun. 19, 2013

(86) PCT No.: PCT/EP2013/001810
§ 371 (c)(1),
(2) Date: Jan. 12, 2015

(87) PCT Pub. No.: WO2014/008978
PCT Pub. Date: Jan. 16, 2014

(65) Prior Publication Data
US 2015/0189674 A1    Jul. 2, 2015

(30) Foreign Application Priority Data

Jul. 12, 2012 (EP) .................................. 12360050

(51) Int. Cl.
*H04W 74/00* (2009.01)
*H04W 72/04* (2009.01)
(Continued)

(52) U.S. Cl.
CPC ..... *H04W 74/004* (2013.01); *H04W 72/0413* (2013.01); *H04W 74/0866* (2013.01); *H04W 72/02* (2013.01); *H04W 72/085* (2013.01)

(58) Field of Classification Search
CPC ........... H04W 74/004; H04W 72/0413; H04W 74/0866
See application file for complete search history.

(56) References Cited

U.S. PATENT DOCUMENTS 7,376,424 B2   5/2008 Kim et al.
2007/0271568 A1   11/2007 Gorokhov
(Continued)

FOREIGN PATENT DOCUMENTS

CN   101919298 A   12/2010
JP   2005-012275   1/2005
(Continued)

OTHER PUBLICATIONS

InterDigital, "Considerations on dynamic R99 RACH fallback scheme," 3$^{rd}$ Generation Partnership Project (3GPP), 3GPP TSG-RAN WG2 Meeting #77bis, R2-121698, 5 pages, XP050606407, Jeju, South Korea, Mar. 26-30, 2012.
(Continued)

*Primary Examiner* — Brandon M Renner
*Assistant Examiner* — Jay L Vogel
(74) *Attorney, Agent, or Firm* — Fay Sharpe LLP

(57) ABSTRACT

A method of selecting a common channel type for uplink transmission in a wireless communication network when conflicting instructions are received, a computer program product and user equipment operable to perform that method. The method comprises: attempting to acquire resource on a first type of common channel for uplink transmission of information in accordance with a first received instruction; receiving a second instruction to make any uplink transmission on a second type of common channel; determining whether there is any information to be sent and, if not, ceasing attempts to acquire resource on the first type of common channel. Aspects and embodiments described aim to provide a method to resolve a mixture of commands received by user equipment while aiming to ensure efficient overall network operation.

18 Claims, 3 Drawing Sheets

UE cancels standalone HS-DPCCH transmission

(51) Int. Cl.
*H04W 74/08* (2009.01)
*H04W 72/08* (2009.01)
*H04W 72/02* (2009.01)

(56) References Cited

U.S. PATENT DOCUMENTS

| | | | |
|---|---|---|---|
| 2008/0212615 A1 | 9/2008 | Ranta-Aho et al. | |
| 2009/0143074 A1* | 6/2009 | Pelletier | H04W 72/1284 455/452.2 |
| 2009/0262680 A1 | 10/2009 | Choi et al. | |
| 2012/0250599 A1* | 10/2012 | Henttonen | H04W 52/0216 370/311 |
| 2012/0250644 A1* | 10/2012 | Sambhwani | H04W 72/0413 370/329 |
| 2013/0044663 A1* | 2/2013 | Mohan | H04W 74/0858 370/311 |
| 2013/0170444 A1* | 7/2013 | Pani | H04W 72/0413 370/329 |
| 2015/0104658 A1 | 4/2015 | Jahns et al. | |

FOREIGN PATENT DOCUMENTS

| | | |
|---|---|---|
| RU | 2428818 | 9/2011 |
| WO | WO 2009/088858 A1 | 7/2009 |
| WO | WO 2009/100756 | 8/2009 |

OTHER PUBLICATIONS

Ericsson et al., "Way forward for fallback to PRACH R99," $3^{rd}$ Generation Partnership Project (3GPP), 3GPP TSG-RAN WG2 #77bis, R2-121894, pp. 1-2, XP050606568, Jeju, South Korea, Mar. 26-30, 2012.

Qualcomm Incorporated, "A dynamic mechanism for Fallback to Rel-99 PRACH," $3^{rd}$ Generation Partnership Project (3GPP), 3GPP TSG RAN WG2 Meeting #77bis, R2-120586, 4 pages, XP050565458, Dresden, Germany, Feb. 10-14, 2012.

Qualcomm Incorporated et al., "Introduction of Further Enhancements to CELL_FACH in 25.308," $3^{rd}$ Generation Partnership Project (3GPP), 3GPP TSG-RAN2 Meeting #78, R2123039, 3 pages, XP050607659, Prague, Czech Republic, May 21-25, 2012.

International Search Report for PCT/EP2013/001810 dated Aug. 27, 2013.

* cited by examiner

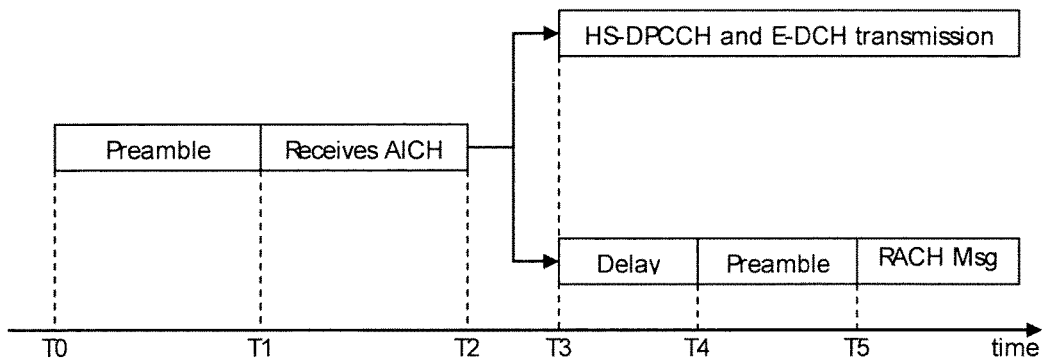
Figure 2: Time diagram of HS-DPCCH and RACH transmissions.
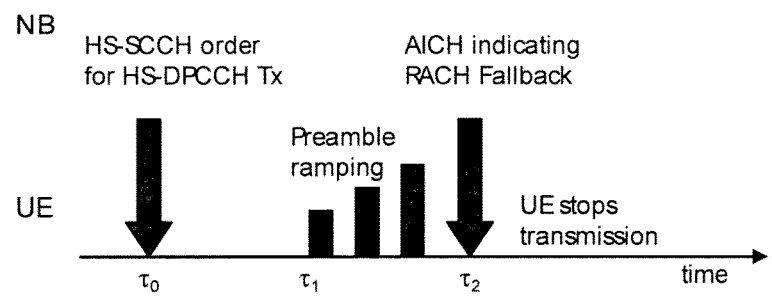
Figure 3: UE stops transmission after receiving fallback indicator

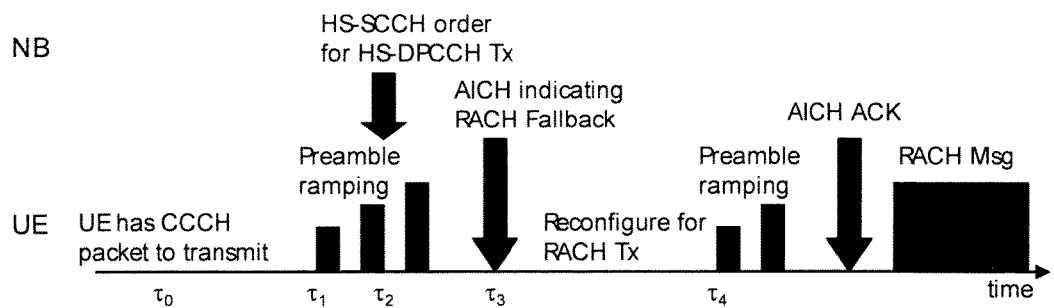
*Figure 4: UE cancels standalone HS-DPCCH transmission*
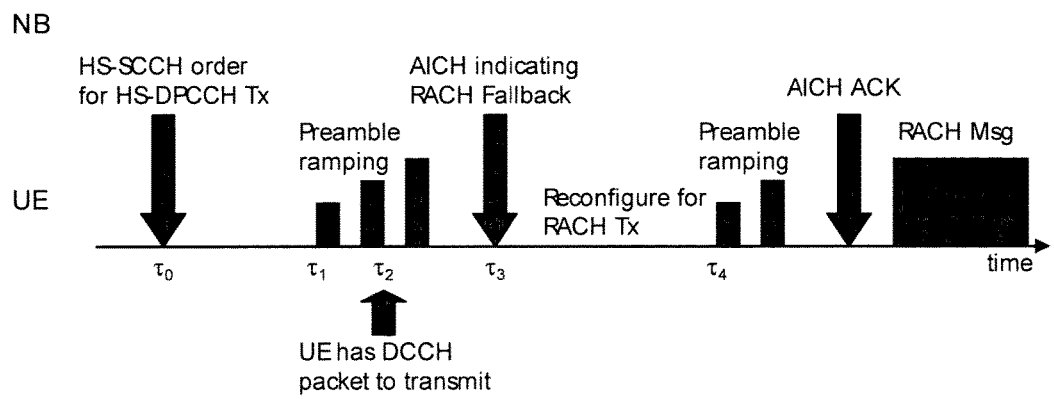
*Figure 5: UE cancels standalone HS-DPCCH transmission*

COMMON CHANNEL AQUISITION

FIELD OF THE INVENTION

A method of selecting a common channel type for uplink transmission in a wireless communication network, a computer program product and user equipment operable to perform that method.

BACKGROUND

Wireless telecommunications systems are known. In a cellular system, radio coverage is provided to user equipment, for example, mobile telephones, in areas known as cells. A base station is located in each cell to provide radio coverage. User equipment in each cell receives information and data from a base station and transmits information and data to the base station.

Information and data transmitted by a base station to the user equipment typically occurs on channels of radio carriers known as "downlink" carriers. Information and data transmitted by user equipment to a base station occurs on uplink data channels of radio carriers known as "uplink" carriers.

Functionality of user equipment operating in a CELL_FACH state has been enhanced by implementation of various sub-features. Two such sub-features are: (i) standalone HS-DPCCH transmission and (ii) RACH fallback.

A HS-DPCCH (High Speed-Dedicated Physical Control Channel) is a channel used by user equipment on the uplink to carry control information, such as CQI (Channel Quality Index) and acknowledgements for downlink HS-DSCH (High Speed-Dedicated Shared Channel) packets. The HS-DPCCH (or feedback channel) allows feedback information to be transmitted back to a base station so that appropriate transport block sizes can be chosen, on the basis of CQI information, and so that blind retransmissions can be minimized as a result of ack/nack messaging.

According to the RACH fallback sub-feature, user equipment operating in a CELL_FACH state is operable to request allocation of a common or shared channel, for example an E-DCH (Enhanced-Dedicated Channel) resource. If user equipment is operating within a cell of a network which is experiencing congestion and the common channels are being heavily used, there may be no common resource available for allocation to that user equipment. The RACH fallback sub-feature allows a base station to operate to indicate to user equipment requesting common resource that it should "fall back" to operate using a Random Access Channel (RACH) for uplink transmissions.

It will be appreciated that the co-existence of the RACH fallback sub-feature and the standalone feedback sub-feature can lead to conflict in operation at user equipment.

Aspects aim to resolve conflict between sub-features without impacting overall network operation.

SUMMARY

Accordingly, a first aspect provides a method of selecting a common channel type for uplink transmission in a wireless communication network when conflicting instructions are received; the method comprising:

attempting to acquire resource on a first type of common channel for uplink transmission of information in accordance with a first received instruction; receiving a second instruction to make any uplink transmission on a second type of common channel; determining whether there is any information to be sent and, if not, ceasing attempts to acquire resource on the first type of common channel.

User equipment may operate in various modes in, for example, a UMTS telecommunications network. On initial turning on of user equipment in a cell, it will typically operate in "idle mode". Once it synchronizes and attaches itself to a base station, it gains a radio resource control (RRC) connection and is referred to as being in a connected mode. User equipment in idle mode does not have a radio resource control (RRC) connection. If user equipment is RRC connected it can be in one of five different RRC states: cell_DCH, cell_FACH, enhanced cell_FACH, cell_PCH or URA_PCH states. User equipment typically moves into cell_DCH state when its traffic is high, since in such a state the user equipment is allocated a dedicated channel on which to transmit and receive data from a base station. In UMTS network architecture, user equipment can be in cell_DCH state, where it is expected to have a high volume of traffic. Operation in a cell_DCH state is typically highly demanding of battery power.

User equipment operates, when not in cell_DCH state, using a random access channel (RACH) on the uplink and a base station operates to communicate with user equipment using a forward access channel (FACH). RACH and FACH have a very small data carrying ability. In WCDMA or UMTS systems, the capability for user equipment and base stations to operate and communicate data traffic therebetween using a shared or common resource on downlink and uplink when user equipment is in cell_FACH state has been introduced via enhanced cell_FACH. In the uplink, the data traffic transmission occurs using an enhanced dedicated channel (E-DCH) and in the downlink, traffic is sent on a high speed downlink shared channel (HS-DSCH). Those channels allow user equipment and base stations to communicate and transmit larger data packets between themselves for a time, without the need for a user equipment to enter a cell_DCH state. Such an arrangement allows user equipment to remain in the cell_FACH state longer without transitioning to a more dedicated state, thus allowing a power consumption saving.

It will be appreciated that some data traffic may be particularly bursty in nature; for example, demand may be high whilst user equipment loads a website page, but then substantially zero whilst a user reads that website. Operation in full cell_DCH state for such bursty traffic, increasingly used by smartphones, can be particularly wasteful of battery and thus the ability to handle bursty traffic without entering a more dedicated radio connected state is beneficial.

Functionality of user equipment operating in a CELL_FACH state has been enhanced by implementation of various sub-features. Two such sub-features are: (i) standalone HS-DPCCH transmission and (ii) RACH fallback.

A HS-DPCCH (High Speed-Dedicated Physical Control Channel) is a channel used by user equipment on the uplink to carry control information, such as CQI (Channel Quality Index) and acknowledgements for downlink HS-DSCH (High Speed-Dedicated Shared Channel) packets. The HS-DPCCH (or feedback channel) allows feedback information to be transmitted back to a base station so that appropriate transport block sizes can be chosen, on the basis of CQI information, and so that blind retransmissions can be minimized as a result of ack/nack messaging.

Traditionally, user equipment operating in a CELL_FACH state would be operable to send HS-DPCCH feedback information only if it had uplink data to transmit. The Standalone HS-DPCCH transmission sub-feature (also known as NB triggered HS-DPCCH transmissions) allows a base station (Node B) to trigger user equipment to transmit feedback information on a HS-DPCCH, irrespective of whether user equipment has uplink data to transmit. The base station is typically operable to indicate that it would like to receive HS-DPCCH information from the user equipment by sending a HS-SCCH (High Speed-Shared Control Channel) order to the user equipment. Triggering the transmission of feedback allows the base station to gather feedback information, for example, CQI information, prior to scheduling any HS-DSCH packet thereby allowing the base station to schedule the appropriate transport block size for transmissions to the user equipment. By triggering transmission of feedback information, a base station may also receive feedback information, for example, ACK/NACK indicators, from user equipment for early HS-DSCH packets, and thus avoid a need to perform blind retransmission of those early HS-DSCH packets, those retransmission usually occurring to ensure that user equipment receives those packets in the absence of ACK/NACK messages.

Typically HS-DPCCH feedback information is transmitted from user equipment to a base station using a common (sometimes referred to as "shared") channel. When user equipment is operating in a CELL_DCH state HS-DPCCH feedback can be sent on a dedicated resource. It will be appreciated that shared or common channels in a network are subject to contention, since they are shared between all user equipment operating within a network.

According to the RACH fallback sub-feature, user equipment operating in a CELL_FACH state is operable to request allocation of a common or shared channel, for example an E-DCH (Enhanced-Dedicated Channel) resource. If user equipment is operating within a cell of a network which is experiencing congestion and the common channels are being heavily used, there may be no common resource available for allocation to that user equipment. The RACH fallback sub-feature allows a base station to operate to indicate to user equipment requesting shared resource that it should "fall back" to operate using a Random Access Channel (RACH) for uplink transmissions. The base station may indicate that fallback to the user equipment by use of, for example, a reserved combination of EM value and signature on an AICH (Acquisition Indicator Channel). If such an indication is received by user equipment, the user equipment may then be operable to try to re-access the network using a RACH. The information which is suitable for transmission on a RACH channel may be restricted, for example, user equipment may only be operable to transmit common control channel (CCCH) messages or and dedicated control channel (DCCH) messages on a Random Access Channel (RACH).

The feedback messages sent on a feedback channel, for example, HS-DPCCH for user equipment operating in a CELL_FACH state, are typically such that user equipment is operable to use a common E-DCH resource (in particular, a scrambling code used for E-DCH transmission) for transmission for those feedback messages. User equipment operable to transmit using a RACH use a different set of common resource. When user equipment is operate to transmit on a RACH, it cannot also simultaneously transmit feedback messaging on, for example, a HS-DPCCH.

It will be appreciated that the co-existence of the RACH fallback sub-feature and the standalone feedback sub-feature can lead to conflict in operation at user equipment. In particular, for example, user equipment may receive an HS-SCCH order from a base station to trigger HS-DPCCH transmission, but also a RACH fallback indicator during the process of attempting to acquire resource on which to make transmissions to a base station. That acquisition may, for example, relate to acquisition of either a common E-DCH resource or RACH resource.

It will be appreciated that there are other scenarios in which concurrent requests to implement the sub-features of standalone HS-DPCCH transmission and RACH fallback may occur. One such scenario occurs if an order for HS-DPCCH transmission is received prior to user equipment receiving an AICH instructing RACH fallback. Aspects and embodiments described herein aim to provide a method to resolve such a mixture of commands received by user equipment whilst aiming to ensure efficient overall network operation.

One option would be for user equipment to be operable to ignore a RACH fallback indicator if, prior to receiving the RACH fallback indicator, the user equipment has received an order to perform standalone HS-DPCCH transmissions. According to such an option, user equipment may be operable to treat the RACH fallback indicator as an NACK and the user equipment then continues attempts to obtain a common resource for uplink transmissions, assuming a maximum preamble cycle has not already been reached. It will be appreciated that such implementations do not recognize that one reason that a RACH fallback indicator may be sent to user equipment by a base station is there are no available common E-DCH resources. Forcing user equipment to operate to try to obtain such an unavailable resource may make congestion occurring within a cell of a network worse.

According to aspects and embodiments described, user equipment which has previously received an order to perform standalone feedback transmissions, for example, using messages on a HS-DPCCH of an E-DCH, is operable to obey an instruction to fallback to RACH in dependence upon buffer occupancy of the user equipment.

The first aspect recognizes that if an indicator indicating only a second type of common channel is available to user equipment, it is likely that the first type of common channel, which is being requested, is unavailable or experiencing congestion and therefore a request for a first type of common channel is unlikely to be successful. That request process can itself act to congest signalling within a network and the first aspect recognizes that by minimizing that signalling can aid overall network operation.

The first aspect recognizes that common channels in a network are shared between user equipment in a cell and that a cell containing large numbers of user equipment may experience significant contention for shared resource. The types of common channels available within a network may only be suited to carrying specific types of information or messaging. A first type of shared or common channel may carry a first type of information or messaging and a second may be unable to carry the same type of information or messaging.

The first aspect recognises that receiving an instruction to use a second type of common channel is likely to indicate that there are no common resources available of the requested first type.

The first aspect recognises that an attempt to obtain a first type of common channel may be made before there is any information or data in a user equipment buffer for transmission to a base station. If there is no information in the buffer to be sent to the network continuing to try to obtain a first type of channel when it has been indicated that only a second type of shared channel is available may be detrimental to overall network operation.

In one embodiment, attempting to acquire resource on a first type of common channel for uplink transmission of information comprises attempting to acquire resource for uplink transmission of feedback information on the first type of common channel. Accordingly, before such feedback information has been created or resides in a buffer for transmission to a network, user equipment may be operable to try to obtain a common channel on which such feedback information can sensibly be sent.

In one embodiment, the method comprises receiving an instruction to acquire resource for uplink transmission of feedback information on the first type of common channel. Accordingly, it may only be possible to send feedback information on a first type of common channel within a network.

In one embodiment, the feedback information comprises channel quality information regarding received downlink channels. Accordingly, feedback information may be used by the network to improve overall operation. Receiving channel quality information may aid a base station when choosing a suitable transport block size for downlink transmissions to user equipment.

In one embodiment, the method comprises determining whether there is information to be sent and whether any of that information can be sent on the second type of common channel and, if so, sending that information on the second type of common channel. Accordingly, if it is determined that information or data in a buffer at user equipment exists, it may be possible to send some, or all of that information on the second type of common channel, even though ideally it would be sent on the first type of channel. If it is determined that the information or data may be sent using the second type of channel, appropriate reconfiguration of some, or all, information can occur and that information can be sent on the second type of common channel.

In one embodiment, the method comprises determining whether there is information to be sent and whether any of that information can be sent on the second type of common channel and, if not, continuing attempts to acquire resource on the first type of common channel. Accordingly, if it is determined that information or data in a buffer at user equipment exists, it may be determined that it is not possible to send any of that information on the second type of common channel, and, subject to a maximum number of preamble procedures, or usual back off procedures, the method may allow further attempts to obtain a first type of common channel to continue.

In one embodiment, the first type of common channel comprises an E-DCH.

In one embodiment, the second type of common channel comprises a RACH.

In one embodiment, the instruction to acquire resource for uplink transmission of feedback information on the first type of common channel comprises an HS-SCCH order to perform HS-DPCCH transmissions.

A second aspect provides a computer program product operable, when executed on a computer, to perform the method of the first aspect.

A third aspect provides user equipment operable to select a common channel type for uplink transmission in a wireless communication network when conflicting instructions are received; the user equipment comprising: acquisition logic operable to attempt to acquire resource on a first type of common channel for uplink transmission of information in accordance with a first received instruction; reception logic operable to receive a second instruction to make any uplink transmission on a second type of common channel; and determination logic operable to determine whether there is any information to be sent and, if not, ceasing attempts to acquire resource on the first type of common channel in accordance with said first received instruction.

In one embodiment, the acquisition logic is operable to attempt to acquire resource for uplink transmission of feedback information on the first type of common channel.

In one embodiment, the user equipment further comprises feedback order reception logic operable to receive an instruction to acquire resource for uplink transmission of feedback information on the first type of common channel.

In one embodiment, the feedback information comprises channel quality information regarding received downlink channels.

In one embodiment, the determination logic is operable to determine whether there is information to be sent and whether any of that information can be sent on the second type of common channel and, if so, to send that information on the second type of common channel.

In one embodiment, the determination logic is operable to determine whether there is information to be sent and whether any of that information can be sent on the second type of common channel and, if not, to instruct said acquisition logic to continue attempts to acquire resource on the first type of common channel.

In one embodiment, the first type of common channel comprises an E-DCH.

In one embodiment, the second type of common channel comprises a RACH.

In one embodiment, the instruction to acquire resource for uplink transmission of feedback information on the first type of common channel comprises an HS-SCCH order to perform HS-DPCCH transmissions.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which:

FIG. 2 illustrates schematically possible processes which may be implemented when user equipment attempts to acquire resource in a network; and FIGS. 3 to 5 illustrate schematically messaging between a base station and user equipment according to embodiments.

DESCRIPTION OF THE EMBODIMENTS

Figure 1:
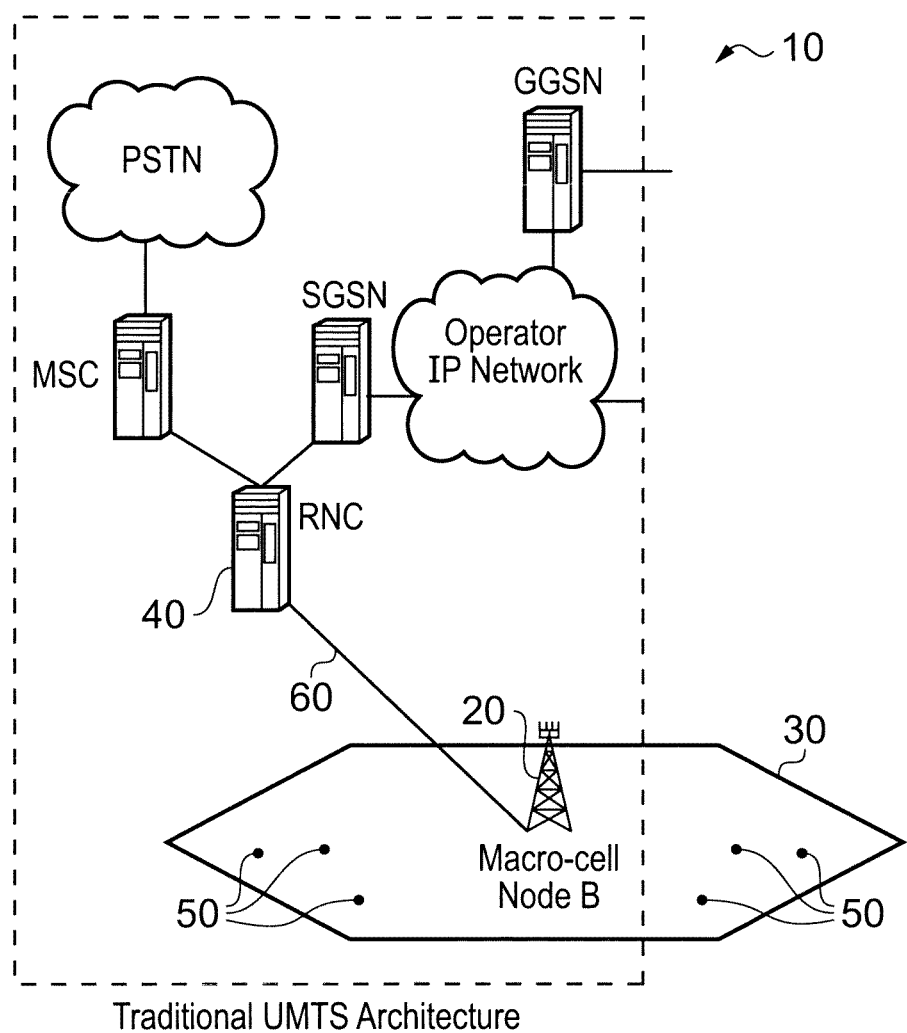
FIG. 1 illustrates the main components of a wireless telecommunications network according to one embodiment.

FIG. 1 illustrates schematically the main components of a wireless telecommunications system, generally 10, according to one embodiment. User equipment 50 roam through the wireless telecommunications system 10. Base stations 20 are provided which support areas of radio coverage 30. A number of such base stations 20 are provided and distributed geographically in order to provide a wide area of coverage to user equipment 50. When user equipment 50 is within an area served by a base station 20, communications may be established between the user equipment 50 and the base station 20 over associated radio links. Each base station 20 typically supports a number of sectors within the geographical area of service 30.

Typically, a different antenna within a base station 20 supports each associated sector. Each base station 20 has multiple antennas. It will be appreciated that FIG. 1 illustrates a small subset of a total number of user equipment 50 and base stations 20 that may be present in a typical wireless communications system 10.

The wireless communications system 10 is managed by a radio network controller (RNC) 40. The radio network controller 40 controls operation of the wireless tele-communications system 10 by communicating with a plurality of base stations 20 over a backhaul communications link 60. The RNC 40 also communicates with user equipment 50 via each base station 20 and thus effectively manages a region of the entire wireless communications system 10.

User equipment 50 communicates with base station 20 by transmitting data and information on channels known as "uplink" or "reverse" channels, and base station 20 communicates with user equipment 50 by transmitting data and information on radio channels known as "downlink" or "forward" channels.

Overview

Before discussing the embodiments in any more detail, first an overview will be provided.

Functionality of user equipment operating in a CELL_FACH state has been enhanced by implementation of various sub-features. Two such sub-features are: (i) standalone HS-DPCCH transmission and (ii) RACH fallback.

A HS-DPCCH (High Speed-Dedicated Physical Control Channel) is a channel used by user equipment on the uplink to carry control information, such as CQI (Channel Quality Index) and acknowledgements for downlink HS-DSCH (High Speed-Dedicated Shared Channel) packets. The HS-DPCCH (or feedback channel) allows feedback information to be transmitted back to a base station so that appropriate transport block sizes can be chosen, on the basis of CQI information, and so that blind retransmissions can be minimized as a result of ack/nack messaging.

Traditionally, user equipment operating in a CELL_FACH state would be operable to send HS-DPCCH feedback information only if it had uplink data to transmit. The Standalone HS-DPCCH transmission sub-feature (also known as NB triggered HS-DPCCH transmissions) allows a base station (Node B) to trigger user equipment to transmit feedback information on a HS-DPCCH, irrespective of whether user equipment has uplink data to transmit. The base station is typically operable to indicate that it would like to receive HS-DPCCH information from the user equipment by sending a HS-SCCH (High Speed-Shared Control Channel) order to the user equipment. Triggering the transmission of feedback allows the base station to gather feedback information, for example, CQI information, prior to scheduling any HS-DSCH packet thereby allowing the base station to schedule the appropriate transport block size for transmissions to the user equipment. By triggering transmission of feedback information, a base station may also receive feedback information, for example, ACK/NACK indicators, from user equipment for early HS-DSCH packets, and thus avoid a need to perform blind retransmission of those early HS-DSCH packets, those retransmission usually occurring to ensure that user equipment receives those packets in the absence of ACK/NACK messages.

Typically HS-DPCCH feedback information is transmitted from user equipment to a base station using a shared or common channel. It will be appreciated that shared or common channels in a network are subject to contention, since they are shared between all user equipment operating within a network.

According to the RACH fallback sub-feature, user equipment operating in a CELL_FACH state is operable to request allocation of a common or shared channel, for example an E-DCH (Enhanced-Dedicated Channel) resource. If user equipment is operating within a cell of a network which is experiencing congestion and the common E-DCH channels are being heavily used, there may be no shared resource available for allocation to that user equipment. The RACH fallback sub-feature allows a base station to operate to indicate to user equipment requesting shared resource that it should "fall back" to operate using a Random Access Channel (RACH) for uplink transmissions. The base station may indicate that fallback to the user equipment by use of, for example, a reserved combination of EAI value and signature on an AICH (Acquisition Indicator Channel). If such an indication is received by user equipment, the user equipment may then be operable to try to re-access the network using a RACH. The information which is suitable for transmission on a RACH channel may be restricted, for example, user equipment may only be operable to transmit common control channel (CCCH) messages or and dedicated control channel (DCCH) messages on a Random Access Channel (RACH).

The feedback messages sent on a feedback channel, for example, HS-DPCCH for user equipment operating in a CELL_FACH state, are typically such that user equipment is operable to use a common E-DCH resource (in particular, a scrambling code used for E-DCH transmission) for transmission for those feedback messages. User equipment operable to transmit using a RACH use a different set of common RACH. When user equipment is operate to transmit on a RACH, it cannot also simultaneously transmit feedback messaging on, for example, a HS-DPCCH.

It will be appreciated that the co-existence of the RACH fallback sub-feature and the standalone feedback sub-feature can lead to conflict in operation at user equipment. In particular, for example, user equipment may receive an HS-SCCH order from a base station to trigger HS-DPCCH transmission, but also a RACH fallback indicator during the process of attempting to acquire resource on which to make transmissions to a base station. That acquisition may, for example, relate to acquisition of either a common E-DCH resource or RACH resource.

FIG. 2 illustrates schematically possible processes which may be implemented when user equipment attempts to acquire resource in a network. It can be seen that it is possible that a base station may indicate to user equipment via AICH signalling, that there are no common channels available and that the user equipment should fallback to use RACH. That RACH fallback indicator could be received by user equipment between time T1 and T2. Before the user equipment is operable to send a message on a RACH channel, that is to say, between time T2 and T5, during which the user equipment reconfigures to make a RACH transmission rather than an E-DCH transmission and obtains a RACH channel, the user equipment may receive an order from a base station to perform standalone feedback, for example, HS-DPCCH transmissions.

It has been agreed that in such a scenario, user equipment is to be operable to ignore the HS-SCCH order to perform standalone HS-DPCCH transmission and continue with the RACH transmission.

It will be appreciated that there are other scenarios in which concurrent requests to implement the sub-features of standalone HS-DPCCH transmission and RACH fallback may occur. One such scenario occurs if an order for HS-DPCCH transmission is received prior to user equipment receiving a AICH instructing RACH fallback. In other words, if a base station requests standalone feedback before T1 in FIG. 2, and the base station then indicates to user equipment that it is to fallback to RACH between T1 and T2 in FIG. 2. Aspects and embodiments described herein aim to provide a method to resolve such a mixture of commands received by user equipment whilst aiming to ensure efficient overall network operation.

One option would be for user equipment to be operable to ignore a RACH fallback indicator if, prior to receiving the RACH fallback indicator, the user equipment has received an order to perform standalone HS-DPCCH transmissions. According to such an option, user equipment may be operable to treat the RACH fallback indicator as an NACK and the user equipment then continues attempts to obtain a common resource for uplink transmissions, assuming a maximum preamble cycle has not already been reached. It will be appreciated that such implementations do not recognize that one reason that a RACH fallback indicator may be sent to user equipment by a base station is there are no available common E-DCH resources. Forcing user equipment to operate to try to obtain such an unavailable resource may make congestion occurring within a cell of a network worse.

According to aspects and embodiments described in detail below, user equipment which has previously received an order to perform standalone feedback transmissions, for example, using messages on a HS-DPCCH of an E-DCH, is operable to obey an instruction to fallback to RACH in dependence upon buffer occupancy of the user equipment.

In other words, when user equipment receives an order to perform standalone HS-DPCCH transmission before time T1 of FIG. 2 and, during the MCH phase indicated in FIG. 2 that user equipment receives an indication to fallback to RACH, the user equipment is operable to "cancel" any standalone HS-DPCCH transmissions and either: (i) fallback to transmission on a RACH if it is determined that the user equipment buffer has data that is permissible and/or suitable for transmission using RACH, for example a DCCH or CCCH message, or (ii) stop any uplink transmissions the user equipment buffer is determined to contain no data.

Such operation of user equipment recognises that a loading condition at a base station may change after that base station has sent a HS-SCCH order to user equipment to initiate standalone HS-DPCCH transmissions. The loading conditions may change before a base station sends an AICH implementing RACH fallback to user equipment.

It will be appreciated that since a request for common resource from user equipment occurs in layer 1, a base station has no means of identifying user equipment until a common resource allocation has been completed and uplink transmissions are being made. There is no way for a base station to reconcile a standalone feedback request to a particular user equipment with a request being made by user equipment for a common channel.

It will be appreciated that typically a base station will indicate that RACH fallback is necessary if common E-DCH resources are congested within a cell. If a base station indicates RACH fallback is required it is likely that requests from user equipment to obtain a common E-DCH resource for HS-DPCCH transmission will be unsuccessful. Aspects recognise that moving user equipment away from operation that requires continued requests for common resource when a cell is congested can be beneficial to overall network operation.

Aspects also recognise that CCCH or DCCH transmissions that can be sent by user equipment using a RACH should not be delayed if there is no need to do so. In other words, if user equipment has information that can be sent on a RACH, and a RACH fallback indicator has been received from a base station, that information can be sent in appropriate messages on a RACH, despite any previously received HS-SCCH orders to perform standalone HS-DPCCH transmissions.

According to one embodiment, if user equipment has uplink data in its buffer which data cannot be transmitted via RACH, and that uplink data arrived in that buffer between receipt of an order to perform standalone feedback and receipt of a RACH fallback indicator, that user equipment may be operable to backoff for a random time period in accordance with legacy procedures then try again to access the network by requesting common E-DCH resource.

Example 1

FIG. 3 illustrates schematically messaging between a base station and user equipment according to one embodiment. According to the scenario illustrated, user equipment 50 is receives an HS-SCCH order from base station 20, instructing initiation of standalone HS-DPCCH transmissions at time $\tau_0$. As a result, user equipment 50 starts a preamble process at time $\tau_1$ to try to obtain a common E-DCH resource from base station 20 on which to make HS-DPCCH transmissions. The base station 20 sends an AICH at time $\tau_2$ indicating that user equipment 20 is to fallback to RACH since there is no E-DCH resource available. At this time ($\tau_2$) the user equipment 20 buffer is determined to be empty and, in accordance with aspects described, the user equipment is operable to stop any uplink transmissions on RACH or E-DCH channels.

If the user equipment had data to transmit at $\tau_2$ but that data could not be sent via RACH, the user equipment may be operable to backoff a random time before reattempting to obtain a common E-DCH resource to transmit that data.

Example 2

FIG. 4 illustrates schematically messaging between a base station and user equipment according to one embodiment. According to this illustrated example, the user equipment 50 wishes to send a CCCH packet at time $\tau_0$ and thus is operable to start preamble ramping at $\tau_1$ to try to obtain a common E-DCH resource. At time $\tau_2$, during preamble ramping, the user equipment 50 receives a HS-SCCH order from base station 20 instructing initiation of standalone HS-DPCCH transmissions. At time $\tau_3$, the user equipment receives an AICH from the base station 20 indicating that the user equipment is to fallback to RACH. The user equipment is operable to then cancel the standalone HS-DPCCH transmission request and proceed to transmit its CCCH via RACH. This involves reconfiguring itself for RACH transmission and performing the preamble ramping to obtain a RACH resource as shown in FIG. 4 (after time $\tau_3$).

Example 3

FIG. 5 illustrates schematically messaging between a base station and user equipment according to one embodiment.

According to the illustrated scenario, user equipment is operable to receive an HS-SCCH order from base station 20 to initiate standalone HS-DPPCH transmissions at time $\tau_0$. As a result, the user equipment 50 is operable to starts preamble processes at time $\tau_1$ in order to try to obtain a common E-DCH resource for its HS-DPCCH transmissions. During the preamble ramping stage, at time $\tau_2$, the user equipment determines that it has a DCCH packet to transmit. The user equipment then receives an AICH from the base station 20 at time $\tau_3$, indicating that the user equipment should fallback to RACH. Since the DCCH message can be transmitted via RACH, the user equipment is operable to cancel the HS-DPCCH transmission request and then proceed to obtain a RACH resource after time $\tau_3$.

Aspects described allow user equipment to handle concurrent HS-SCCH orders for HS-DPCCH transmission and RACH fallback indication. Aspects do not add to common E-DCH congestion yet also allow user equipment to transmit messages that can be carried via RACH.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of selecting a common channel type for uplink transmission from a user equipment in a wireless communication network when conflicting instructions are received from a base station, said method comprising:
   attempting to acquire resource on a first type of common channel for uplink transmission of information in accordance with a first received instruction comprising an order on a downlink control channel for feedback information on an uplink control channel;
   receiving a second instruction to make any uplink transmission on a second type of common channel, the second instruction indicating to switch to a random access channel;
   dependent upon receiving the first received instruction and the second instruction, determining whether there is any information to be sent and, if not, ceasing attempting to acquire resource on said first type of common channel in accordance with said first received instruction,
   wherein when the result of said determining step is that there is information to be sent, the method further comprises determining whether any of that information can be sent on said second type of common channel and, if so, attempting to send that information on said second type of common channel, and, if not, continuing attempting to acquire resource on said first type of common channel.

2. A method according to claim 1, wherein said attempting to acquire resource on a first type of common channel for uplink transmission of information comprises attempting to acquire resource for uplink transmission of feedback information on said first type of common channel.

3. A method according to claim 1, wherein the first received instruction comprises a first instruction to acquire resource for uplink transmission of feedback information on said first type of common channel.

4. A method according to claim 3, wherein said feedback information comprises channel quality information regarding received downlink channels.

5. A method according to claim 1, comprising waiting for a back-off period before reattempting to acquire resource on said first type of common channel.

6. A method according to claim 5, wherein said back-off period is pseudorandom.

7. A method according to claim 1, wherein said first type of common channel comprises an Enhanced Dedicated Channel (E-DCH).

8. A method according to claim 1, wherein said second type of common channel comprises a Random Access Channel (RACH).

9. A method according to claim 1, wherein said instruction to acquire resource for uplink transmission of feedback information on said first type of common channel comprises an HS-SCCH order to perform High Speed-Dedicated Physical Control Channel (HS-DPCCH) transmissions.

10. A method according to claim 1, wherein said conflicting instructions are received by user equipment operating in a CELL_FACH state.

11. A non-transitory computer-readable medium which stores instructions which when executed by a computer perform the method of claim 1.

12. User equipment operable to select a common channel type for uplink transmission in a wireless communication network when conflicting instructions are received from a base station, said user equipment comprising:
  acquisition logic operable to attempt to acquire resource on a first type of common channel for uplink transmission of information in accordance with a first received instruction comprising an order on a downlink control channel for feedback information on an uplink control channel;
  reception logic operable to receive a second instruction to make any uplink transmission on a second type of common channel, the second instruction indicating to switch to a random access channel;
  determination logic operable to determine whether there is any information to be sent by the user equipment and, if not, ceasing attempts to acquire resource on said first type of common channel in accordance with said first received instruction;
  wherein the user equipment comprises logic to determine, when the result of said determining step is that there is information to be sent, whether any of that information can be sent on said second type of common channel and, if so, to attempt to send that information said second type of common channel, and, if not, to continue to attempt to acquire resource on said first type of common channel.

13. A method according to claim 1, wherein the downlink control channel is a shared control channel and the uplink control channel is a dedicated control channel.

14. A method according to claim 13, wherein the shared control channel is a High-Speed Shared Control Channel (HS-SCCH).

15. A method according to claim 13, wherein the dedicated control channel is a High-Speed Dedicated Physical Control Channel (HS-DPCCH).

16. User equipment according to claim 12, wherein the downlink control channel is a shared control channel and the uplink control channel is a dedicated control channel.

17. User equipment according to claim 16, wherein the shared control channel is a High-Speed Shared Control Channel (HS-SCCH).

18. User equipment according to claim 16, wherein the dedicated control channel is a High-Speed Dedicated Physical Control Channel (HS-DPCCH).

* * * * *